United States Patent [19]

Thompson

[11] Patent Number: 4,599,147
[45] Date of Patent: Jul. 8, 1986

[54] METHOD FOR MAKING IMPROVED SPLIT BEARINGS HAVING MASKED RELIEF AREAS

[75] Inventor: Ronald J. Thompson, Howell, Mich.

[73] Assignee: Federal-Mogul Corporation, Southfield, Mich.

[21] Appl. No.: 629,855

[22] Filed: Jul. 11, 1984

[51] Int. Cl.$^4$ .......................... C25D 5/02; C25D 7/10
[52] U.S. Cl. ......................................... 204/15; 204/25
[58] Field of Search ............................... 204/15, 25, 26

[56] References Cited

U.S. PATENT DOCUMENTS 2,751,340  6/1956  Schaefer ................................ 204/15
2,758,962  8/1956  Tuechauer ............................. 204/25

Primary Examiner—T. M. Tufariello
Attorney, Agent, or Firm—Robert F. Hess; Lawrence J. Shurupoff

[57] ABSTRACT

Split journal bearings having crush relief are made by a method using a special plating rack having urethane masks for covering the ends of the split bearings during electroplating. Split thrust bearings having flanges may also be made according to the present invention by providing masking elements between adjacent bearings to prevent overplating at the flange relief areas or at the flange groove. The method eliminates broaching and/or boring operations to form crush relief areas on bearings but instead provides the required relief areas through the exclusion of overplate from said areas by masking. The plating rack features adjustable masks which are adapted to receive bearings within a range of sizes.

4 Claims, 8 Drawing Figures

METHOD FOR MAKING IMPROVED SPLIT BEARINGS HAVING MASKED RELIEF AREAS

BACKGROUND OF THE INVENTION

This invention relates to a method for making improved split journal bearings wherein relieved areas on bearing surfaces are provided by masking such areas during overplate operations.

Journal bearings, such as those used with journal crankshafts in automobile engines and the like, are generally formed in two parts, known as bearing half shells, which are fitted into cylinder block and/or connecting rod housing bores to provide a superior bearing surface. This type of bearing is known as a split journal bearing and is a high precision, critical part that is manufactured to exacting tolerances.

In the manufacture of split journal bearings, it is important that the height dimension of the bearings be maintained within very close tolerances, measured in ten thousandths of an inch. To keep the two halves of the bearing properly located within the journal bore of the connecting rod, the two halves are forced against one another and crushed slightly to assure a continuous bearing surface and proper fit. Crush relief is provided on the bearing surface of split journal bearings to accommodate any slight deformation caused by the forcing of the two halves into engagement. Crush relief is normally about five to fifteen ten thousandths of an inch in depth. That is, wall size is reduced that amount in the crush relief areas with respect to adjacent areas.

Referring to FIG. 1, the prior art method of providing crush relief is to use material removal techniques for reducing the wall thickness of the bearing lining adjacent the parting face of the bearing prior to the final plating operation. The material removal technique may be broaching wherein a special broach arbor having a series of broaching elements for broaching the wall thickness of the bearing is provided that includes one or more broach elements for broaching the crush relief region. Alternatively, if the bearing wall thickness is formed by high speed boring operation the wall thickness of the bearing is formed by a first boring tool while the crush relief is formed by a second boring tool with an increased bore diameter and offset boring tool axis. With either technique forming crush relief in the bearing lining material adds cost to the manufacturing process and tooling.

After the crush relief area is formed on a bearing lining, the entire inner surface of the bearing is overplated by normal electroplating techniques. One problem with overplating split journal bearings is that overplate may build up at the parting face of the bearing. Build up of overplate at the parting face can cause the bearings to exceed the strict bearing height specifications and result in finished bearings being rejected as scrap.

During plating operations, the bearings are tenuously held by a plating rack since it is heretofore been considered improper to make any contact with the inner bearing surface during the overplating operation that would interfere with even application of plating material on the entire inner surface of the bearing.

In the manufacture of score chamfer type bearings, a high production type of bearing, the score chamfer bearings are retained on a magnetic wand type of rack. With this type of rack adjacent bearings may overlap one another on occasion causing irregularities in the overplate that are rejected upon inspection. The preferred type of plating rack is an end pressure contact rack wherein the ends of a contiguous line of bearings are held under pressure. However with score chamfer type bearings, minor imperfections in the score chamfers may result in the rack of bearings dislodging during the plating operation. The central problem with either type of plating rack is the difficulty in positively holding the bearings during plating.

Thrust bearings, or flanged bearings, include radially extending flanges on axially spaced ends of a journal bearing portion. Flanged bearings are frequently tightly fit within a journal opening and require relief at the flange faces because when the two halves of the flanged bearing are pressed together some limited amount of relief is required to prevent interference that may be caused by the crushing of the two bearing halves together. Therefore, it is necessary to provide flange relief on the flanges immediately adjacent the parting face of the two flanged bearing halves.

Flange relief is normally formed by a broaching operation subsequent to the wall and crush relief broaching operations. The flange face relief operation requires fixturing and broaching as a separate operation on both sides prior to shear broaching the fixtured bearings to proper length.

Flanged grooves are sometimes provided in flanged bearings to facilitate the flow of oil from the cylindrical bearing surface to the flanged bearing surfaces. The prior art manufacturing techniques for producing flange grooves is to mill, coin or broach the flange grooves into the flanges. Any of these operations require a separate fixturing set up and manufacturing step from the wall broaching and flange relief broaching operations.

SUMMARY OF THE INVENTION

According to the method of the present invention, split journal bearings are formed by first forming a bi-metal strip into a semi-cylindrical configuration that is subsequently broached to form a bearing body having a predetermined wall thickness. The bearing body is then placed in a plating rack having mask elements for positively gripping the ends of the split journal bearing and simultaneously masking the crush relief area of the split journal bearings to prevent application of overplate in the crush relief area and on the parting face of the bearings.

Split journal bearings made according to the method of the present invention comprise a semi-cylindrical bearing back including a lining of bearing material bonded to the bearing back with a layer of overplate only being applied to the portion of the bearing material lining between the crush relief areas. In flanged bearings made according to the present invention, overplate is omitted in the crush relief area on the cylindrical portion of the bearing and at the flange relief area located on the flanges of the bearing immediately adjacent the parting face of the flange. Flange grooves may also be provided by excluding overplate in prescribed portions of the flanges to form flange grooves by the simple expedient of masking the flanges in such regions.

The plating rack of the present invention includes a plating rack box for substantially enclosing a plurality of bearings that are held in place by means of rails which extend across one side of the plating rack and co-act with other longitudinally extending fixturing elements to retain the bearings in alignment with one another. According to the invention rigid masking elements engage the ends of the bearings to be plated to prevent plating at the ends of the bearings in the crush relief, flange relief, and on the parting face while simultaneously acting to positively hold the bearings in place in the plating rack.

These and other advantages of the present invention will be better understood upon studying the attached drawings in view of the following detailed description of the invention.

DETAILED DESCRIPTION

Figure 1:
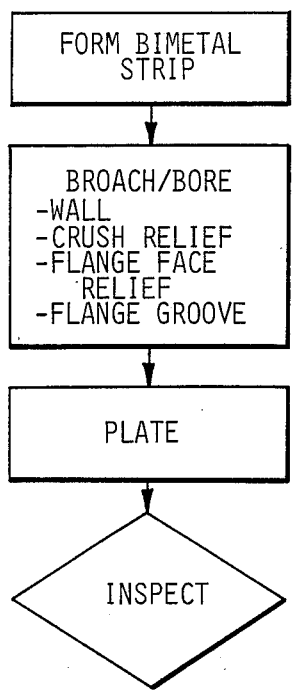
FIG. 1 is a block diagram illustrating the prior art procedure for manufacturing split journal bearings which have a crush relief area formed therein.
Figure 2:
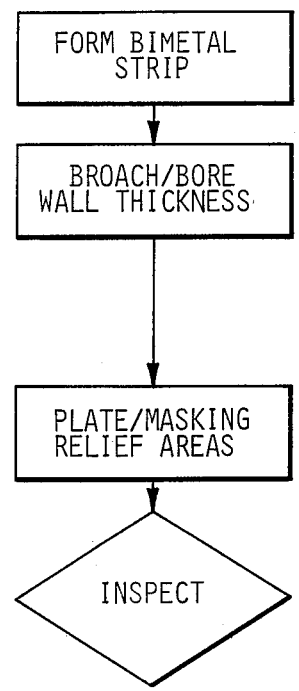
FIG. 2 is a block diagram illustrating a preferred process for fabricating split journal bearings according to the present invention.

Referring now to the drawings, in FIG. 2 a preferred method of the present invention is shown diagrammatically to include a first step of forming a bi-metal strip into a semi-cylindrical configuration having a concave bearing surface. Next, the concave bearing surface is broached to a predetermined wall thickness. After broaching, a plurality of the bearings are placed in a plating rack which includes masking elements which engage opposite ends of the bearing during the plating operation, masking the crush relief area of the bearing and holding the bearings in place during the plating operation. As the final step, the bearings are inspected for compliance with precision specifications.

Figure 3:
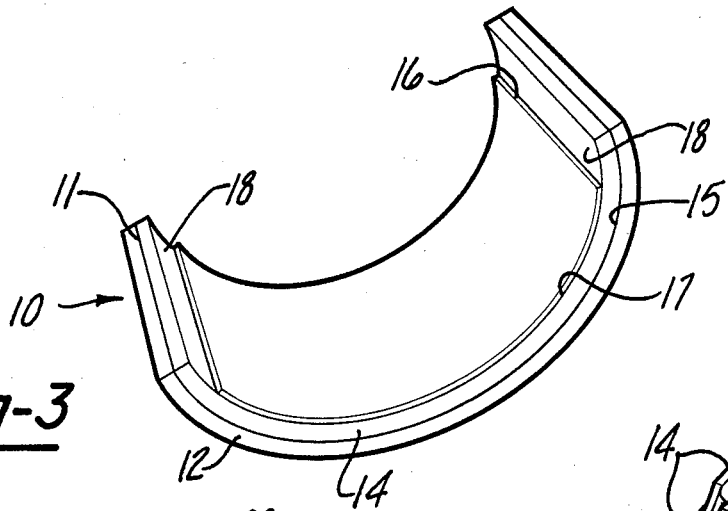
FIG. 3 is a perspective view of a split journal bearing manufactured according to a preferred version of the present invention.

Referring now to FIG. 3, a split journal bearing 10 is shown to include a bi-metal strip 11 which is made up of a bearing back 12 and a lining 14. The bearing back 12 is preferably made of steel while the lining 14 is made of a bearing material such as copper-lead or aluminum alloys, depending upon the characteristics desired in a particular bearing application. The lining 14 has been previously bonded to the concentric inner surface 15 of the bearing back 12 prior to forming the bearing.

A layer of overplate 16, shown enlarged in FIG. 3 to aid in understanding the invention, is applied to the concentric bearing surface 17 of the lining material 14. The overplate 16, according to the invention, does not extend into the crush relief areas 18 on opposite ends of the bearing. By not applying overplate to the crush relief areas 18, the need to remove lining material for the purpose of providing crush relief in the prior broaching and or boring processes is eliminated. The omission of overplate provides sufficient crush relief to accommodate the limited amount of distortion that occurs when the bearing halves are assembled together in the crankshaft bore.

Figure 4:
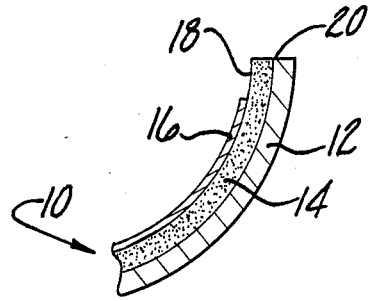
FIG. 4 is a fragmentary cross sectional view of one end of a split journal bearing manufactured according to the present invention.

Referring now to FIG. 4, the relationship of the bearing back 12, lining 14, and overplate 16 at one end of a split journal bearing 10 is shown. The crush relief area 18 is formed by the termination of the overplate 16 at a point spaced from the parting face 20.

Figure 5:
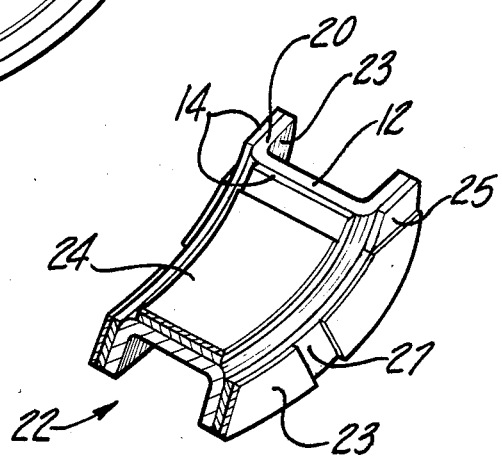
FIG. 5 is a fragmentary perspective view of a flanged bearing manufactured according to one version of the present invention to provide crush relief, flange relief, and a flange groove according to the present invention.

Referring now to FIG. 5, a fragmentary portion of a flanged bearing is shown to include flanges 23 that extend radially from opposite sides of a cylindrical portion 24. The flanges 23 are located on opposite ends of the cylindrical portion 24 which is similar to the plain split journal bearing shown in FIG. 3. The flanged bearing 22 includes a bearing back 12 with a lining 14 of a bearing material applied thereto on the external surfaces of the flanges and the cylindrical portion 24 prior to forming.

Flange face relief 25 is provided adjacent the parting face 20 of the flange bearing 22 on the flanges 23 by omitting overplate in the flange relief area.

A flange groove 27 can be likewise provided by masking the flange during the overplate operation in the area where the flange groove 27 is desired.

Figure 6:
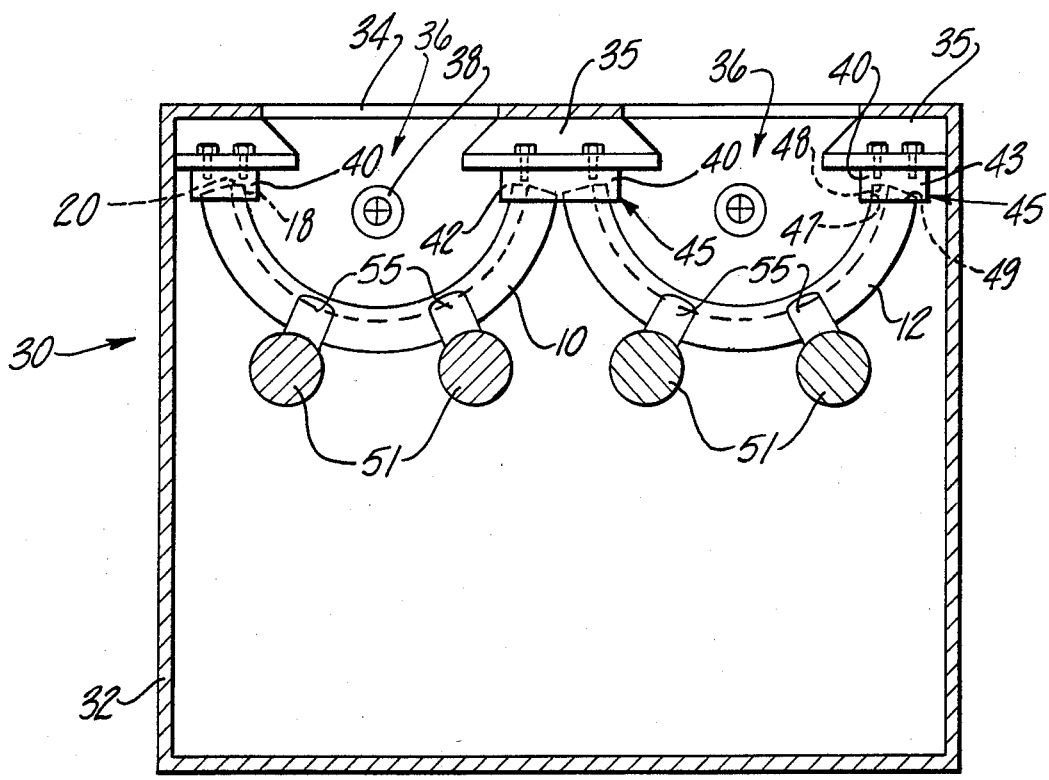
FIG. 6 is an end cross sectional view of a double row plating rack for flanged bearings.
Figure 7:
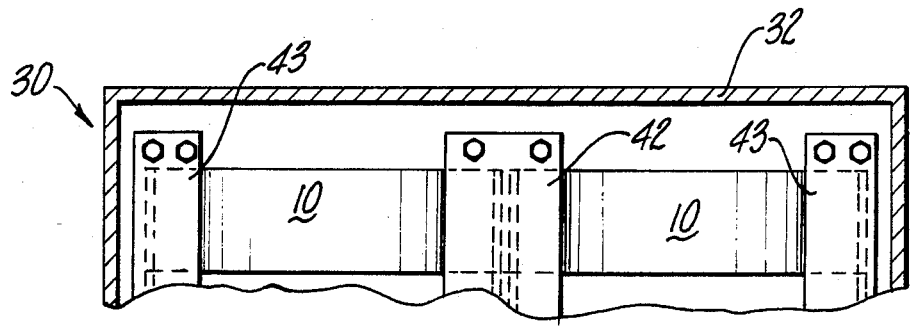
FIG. 7 is a fragmentary cross sectional plan view of a plating rack for plain journal bearings (non-flanged).
Figure 8:
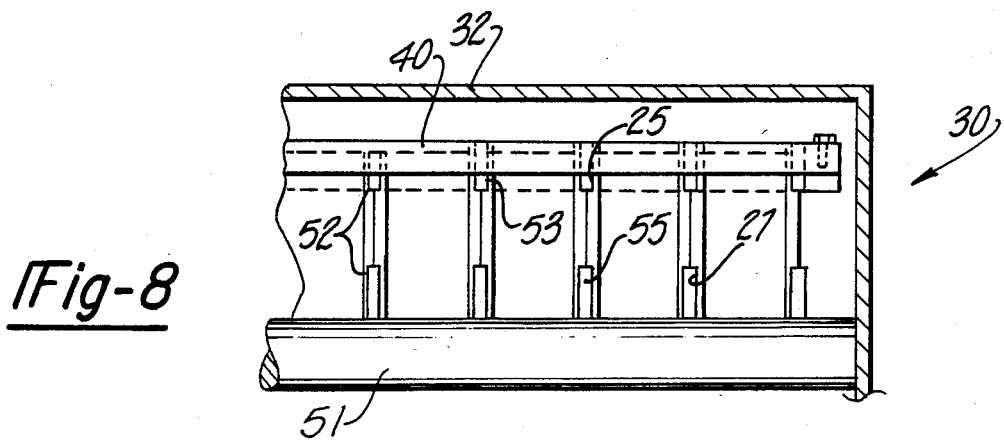
FIG. 8 is a fragmentary cross sectional elevational view of the plating rack shown in FIG. 6.

The plating rack 30 shown in FIGS. 6 through 8, is an example of a double row plating rack that may be used to practice the method of the present invention to form split journal bearings. The plating rack 30 includes a box 32 which substantially encloses a plurality of bearings to be plated during the plating operation. One side 34 of the box 32 is substantially open except for rails 35 which extend longitudinally along one side 34 of the box 32. The rails 35 define slots 36 which are provided to permit the anodes 38 to be positioned in the box 32 for efficiently electroplating the inner surface of the bearings 10. Semirigid masks 40 are attached to the rails 35 by suitable fasteners. The masks 40 are prefrably formed of a urethane or similar material that is nonconductive and acts as a shield which prevents overplating in the crush relief area 18 and on the parting face 20 of the bearings. The masks 40 positively engage the ends of the bearing as will be discussed below.

In FIGS. 6 and 7, the preferred double row plating rack is shown wherein two rows of bearings may be conveniently plated at the same time. The central rail includes a double mask 42 which is adapted to receive the ends of two bearings 10 side by side. Adjustable end mask elements 43 are mounted on the rails 35 which are closest to the sides of the box 32 and are movable toward and away from the central rail to accommodate different size bearings.

The bearing end receptacles 45 formed in the masks 40 must be the proper size to engage the ends of the bearings preventing overplating in the areas engaged by the masks 40 and to holding the bearings in place during the plating operation. The bearing end receptacles 45 include a bearing surface engaging land 47 that covers the crush relief area 18 of the concentric bearing surface of 17 of the lining 14. A parting face engaging land 48 is provided in the bearing end receptacle 45 to engage the parting face 20 and prevent application of overplate on the parting face 20. A bearing back 12 engaging land 49 of lesser extent than the bearing surface engaging land 47 is provided to mask the bearing back 12 adjacent the parting face 20 to further preclude application of overplate on the parting face 20.

The bearings 10 are positively held between the bearing end receptacles 45 and the cathodes 51 which wedge the bearings securely into the bearing end receptacles 45. The cathodes 51 are preferably adjustable to permit bearings of different sizes to be plated in the same plating rack. The cathodes act to ground the bearings and together with the anodes 38 which are located adjacent the inner surface of the bearing 10 create the required electrical field for electroplating.

As shown in FIG. 8, special fixturing elements 52 may be provided in the plating rack 30 to mask flanges of adjacent flanged bearings. A flange relief mask 53 and flange groove mask 55 may be inserted between adjacent flange bearings to establish flange face relief 25 and a flange groove 27. The flange relief mask 53 and flange groove mask 55 may be either separate elements or a combined element made of urethane or another material capable of preventing overplating in the regions covered thereby.

The embodiment of the invention as shown and described above is intended to be an example of the preferred embodiment of the present invention as it is presently conceived, however, various changes and modifications may be made without departing from the invention as described by the following claims.

I claim:

1. A method of making a split journal bearing comprising the steps of:
   (a) forming a bi-metal strip into a semi-cylindrical bearing member having a concave bearing surface extending throughout the length thereof to a parting face at each opposed circumferential end of said bearing member;
   (b) machining the concave bearing surface to form a bearing body having a predetermined wall thickness;
   (c) placing said bearing body in a plating rack;
   (d) masking a minor portion of said concave bearing surface at each said end of said bearing member adjacent and contiguous with a respective said parting face in the plating rack to prevent plating said minor portions and;
   (e) plating the concave bearing surface of the bearing bodies except at said minor portions to form a split journal bearing having a plated concave bearing surface portion and an unplated portion thereof at said ends forming respective crush relief areas of lesser thickness than said plated concave bearing surface portion.

2. The method of claim 1 wherein said masking step further includes masking the parting faces of the bearing to prevent overplate application at the parting face.

3. The method of claim 1 wherein said bearing is a thrust bearing having radially extending flanges and including the further step of masking the opposite ends of the flanges immediately adjacent the parting face of the thrust bearing to provide flange relief at said masked area.

4. The method of claim 3 further including the step of masking a region spaced from the flange relief areas to form a flange groove which extends radially outwardly from the concave bearing surface between the ends of the flange.

* * * * *